United States Patent [19]

van der Lely

[11] 4,205,793
[45] Jun. 3, 1980

[54] SPREADER

[76] Inventor: Cornelis van der Lely, 7, Brüschenrain, Zug, Switzerland

[21] Appl. No.: 854,371

[22] Filed: Nov. 23, 1977

[30] Foreign Application Priority Data

Nov. 29, 1976 [NL] Netherlands ..................... 7613260

[51] Int. Cl.² ............................................ A01C 17/00
[52] U.S. Cl. ................................. 239/682; 239/661; 239/683; 239/684
[58] Field of Search ................ 239/661, 670, 681–684, 239/687

[56] References Cited

U.S. PATENT DOCUMENTS

| | | | |
|---|---|---|---|
| 1,776,814 | 9/1930 | Lutz | 239/682 |
| 2,099,369 | 11/1937 | Lutz | 239/670 X |
| 2,302,413 | 11/1942 | Blackwelder et al. | 239/682 |
| 2,560,981 | 7/1951 | Plouffe | 239/683 |
| 2,882,060 | 4/1959 | Speicher | 239/687 |
| 2,989,314 | 6/1961 | Larson | 239/682 |

FOREIGN PATENT DOCUMENTS

| | | | |
|---|---|---|---|
| 2001714 | 7/1970 | Fed. Rep. of Germany | 239/670 |
| 2533814 | 10/1976 | Fed. Rep. of Germany | 239/661 |
| 647861 | 10/1962 | Italy | 239/687 |
| 1022777 | 3/1966 | United Kingdom | 239/684 |

*Primary Examiner*—Robert W. Saifer
*Attorney, Agent, or Firm*—Mason, Mason and Albright

[57] ABSTRACT

A spreader which is for fertilizer or seed is adapted to be carried by a three-point hitch of a tractor, the spreader having two side-by-side hopper portions, each hopper portion having eight triangular-shaped wall parts terminating in a circular flat part through which the shaft of an underlying ejector disc distributor extends and connects to an agitator which is rotated in each hopper portion. A variable sized opening is provided in each flat part and such openings are commonly controlled by a lever at the front of the spreader within reach of the tractor's operator. Each hopper portion is funnel shaped and centrally under the spreader between such funnel shaped portions a transmission is mounted on the frame of the spreader, such transmission being in a casing which is adapted to receive, via a shaft extending therefrom, the power take-off shaft of a tractor. The transmission transmits rotary motion to both disc distributors via further shafts extending outboard from the transmission to connect to the vertical rotary shafts for the disc through bevel gears and the like in driving casings. The frame includes two beams which are inclined downwardly to the rear, and, as seen in plan, to define with a forward horizontal beam and isosceles triangle with its apex at the rear. The top of the spreader has an inwardly extending rim on a rectangular portion which is above and connected to the funnel portions. This rim is connectable to an extension piece which defines a parallelepiped space to increase the spreader's capacity.

46 Claims, 7 Drawing Figures

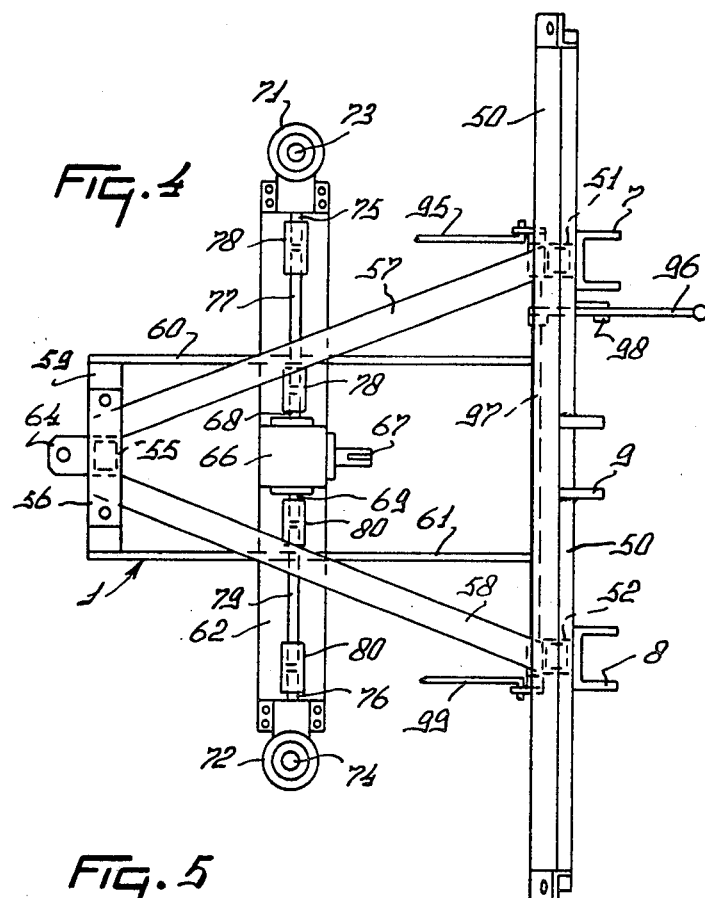
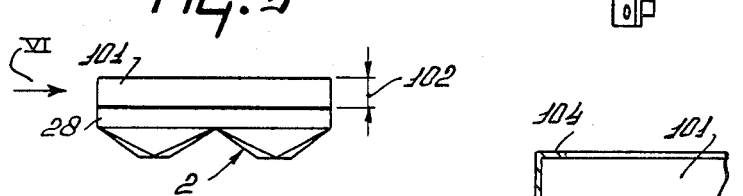
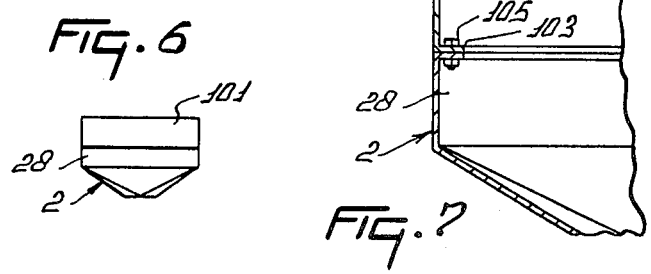

SPREADER

SUMMARY OF THE INVENTION

The invention relates to a spreader, particularly to a spreader having a frame provided with coupling means to be coupled to the lifting device of a tractor or like implement and adapted for spreading granular or powdery material or both such as fertilizer or seeds.

According to a first aspect of the present invention there is provided a spreader comprising a hopper for receiving material to be spread and two distribution members mounted beneath the hopper for rotation about upwardly extending rotary axes, the distribution members, at their points of nearest approach, being spaced apart by a distance which is greater than half the diameter of the circle traced in operation by the radially outermost point of one of the distribution members.

With such a construction, the relative locations of the distribution members are improved so that the spreading ranges of the distribution members satisfactorily adjoin one another and material can be uniformly distributed. Moreover, it is then possible to make an advantageous design of the device. An advantageous embodiment of the device is obtained when the distance between the parallel rotary axes is greater that twice the diameter of the said circle.

According to a second aspect of the present invention there is provided a spreader comprising a frame, a hopper and two distribution members mounted beneath the hopper for rotation about upwardly extending rotary axes, the frame being provided with coupling members for connecting the spreader to lower arms of a lifting device of a tractor, the centers of the distribution members being spaced apart by a distance greater than the distance between the coupling members for connection to the lower arms of the lifting device.

This puts the distribution members in an advantageous position with respect to the vehicle moving the spreader so that the material can be spread uniformly over a broad strip during a run of the device.

According to a third aspect of the present invention there is provided a spreader comprising a frame, a hopper and two distribution members, mounted beneath the hopper for rotation about upwardly extending rotary axes, the hopper having a width, measured perpendicular to the intended direction of operative travel of the spreader, which is at least substantially twice the greatest depth of the hopper.

This gives the hopper a fairly high capacity, whereas the height of the hopper need not be great. It also permits an advantageous construction of the spreader so that it can be easily handled and its hopper can be readily filled.

Where the spreader includes a frame, at least part of this frame is preferably located, viewed on plan, between the distribution members. Therefore, the component parts of the spreader may be readily accessible, and the manufacture of the spreader is facilitated. The frame may comprise an upwardly extending framework of beams secured to the hopper near the front of the spreader, with respect to the intended direction of operative travel.

For a better understanding of the present invention and to show how it may be carried into effect, reference will now be made, by way of example only, to the accompanying drawings, in which:

BRIEF DESCRIPTION OF THE DRAWINGS

FIG. 4 is a plan view of the frame of the spreader, other parts being omitted;

FIG. 5 is a schematic, small-scale rear view of the spreader shown in FIGS. 1 to 4, with an extension piece being disposed on the top of the hopper;

FIG. 6 is a side elevation of the spreader shown in FIG. 5 taken in the direction of the arrow VI in FIG. 5; and FIG. 7 shows on an enlarged scale the connection between the extension piece and the hopper.

DESCRIPTION OF THE PREFERRED EMBODIMENTS

Figure 1:
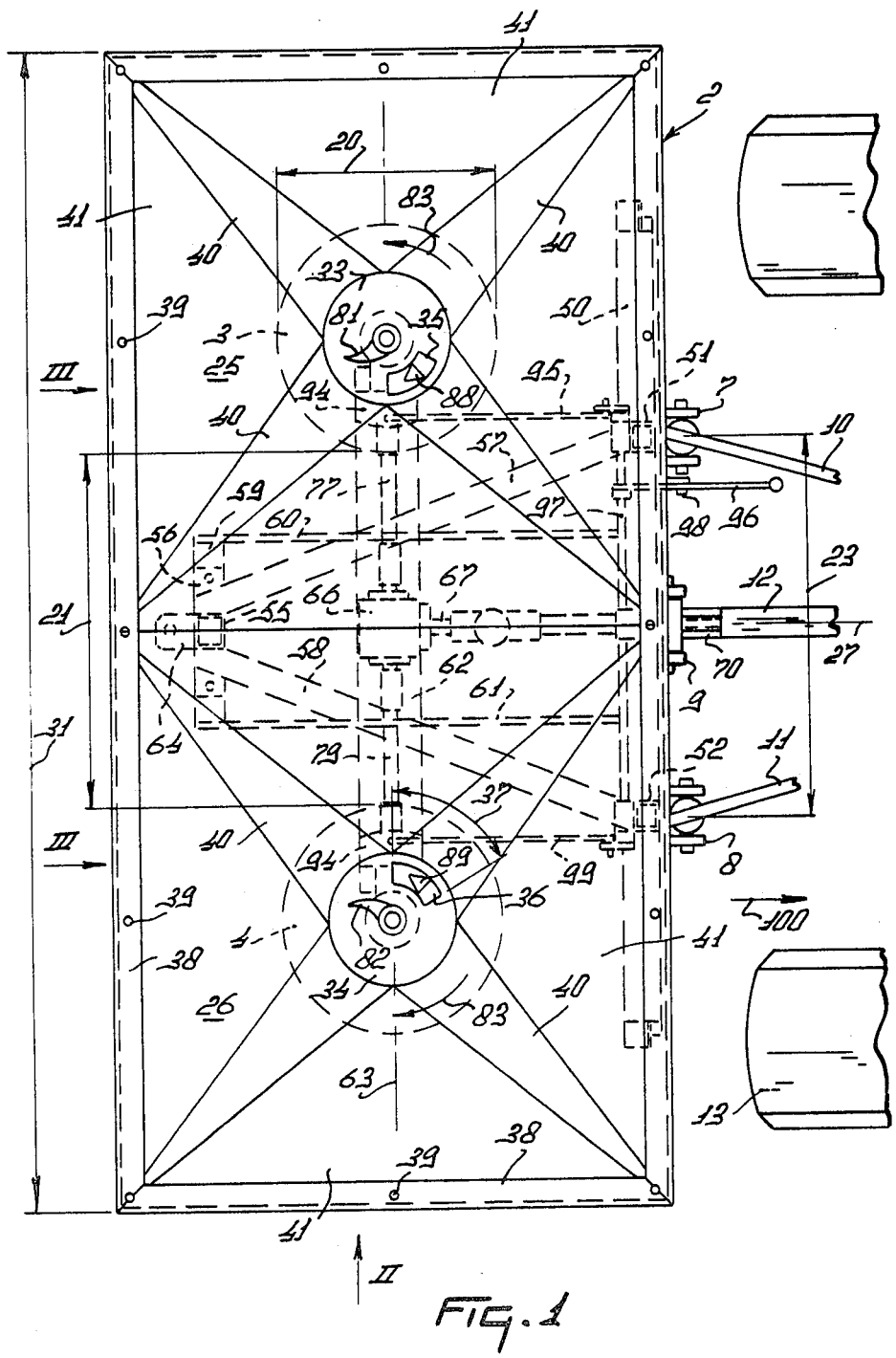
FIG. 1 is a plan view of a spreader.

The spreader shown in FIGS. 1 to 4 comprises a frame 1, on which are arranged a hopper 2 and distribution members 3 and 4 which are mounted for rotation about vertical axes 5 and 6. The frame 1 comprises coupling members in the form of flanges 7, 8 and 9 which are coupled respectively with the lower arms 10, 11 and the top arm 12 of a lifting device of a tractor 13 having its forward operative travel indicated by arrow 100. The distribution members 3 and 4 are identical to each other and each comprises a disc provided with three blades, although more than three blades could be used. Also, although only two distribution members are provided in the illustrated embodiment, other embodiments may have more than two.

Each distribution member has a diameter 20, which is preferably not smaller than thirty centimeters and not larger than fifty-five centimeters. The embodiment illustrated is a particular advantageous embodiment and its distribution members each have diameters of about forty centimeters. The distribution members 3 and 4 are spaced apart, at their points of closest approach, by a distance 21 of more than half the diameter 20. The distance 21 preferably exceeds the diameter 20, but is preferably not larger than three times that diameter. In this embodiment the distance 21 is equal to one-and-a-half times the diameter 20 and is therefore about sixty centimeters. This means that the distance 22 between the parallel axes 5 and 6 and hence between the centers of the distribution members is equal to two and one-half times the diameter 20. The distance 22 is larger than the distance between the coupling flanges 7 and 8 connected with the lower lifting arms 10 and 11 of the lifting device of the tractor 13. In this embodiment the distance 22 is about one and one-half times the distance 23.

The hopper 2 has two funnel-shaped portions 25 and 26, which are identical to each other and open out above the distribution members 3 and 4 respectively. The rotary axes 5 and 6 coincide with the respective center lines of the funnel-shaped portions 25 and 26, which taper in the downward direction and join one another in a vertical plane 27 going through the longitudinal center line of the spreader. Above the funnel-shaped portions 25 and 26 the hopper has a parallelepiped-shaped portion 28 having a height 29; the height 30 of the funnel-shaped portions 25 and 26 is about one and one-half times the height 29. The top edges of the funnel-shaped portions 25 and 26 are approximately square, and the overall width 31 of the hopper is twice the length of the hopper, measured in a direction parallel to the vertical plane 27. The width 31 is larger than twice the maximum depth 42 of the hopper and is preferably more than four times the depth 42. In this embodiment the width 31 is approximately five times the depth 42.

The wall of each funnel-shaped portion 25 and 26, as will be apparent from FIG. 1, comprises eight sides i.e. four narrow sides 40 and four broad sides 41. The narrow sides tapering upwardly and the broad sides widening upwardly. The bottom sides of the funnel-shaped portions 25 and 26 are formed by round discs 33 and 34 respectively, in which outlet ports 35 and 36 respectively are provided. The outlet ports 35 and 36 are spaced from axes 5 and 6 and extend through angles of about 60° about those axes. The lower edges of the sides 40 of the funnel-shaped portions 25 and 26 together surround the whole circumference of the bottom parts 33 and 34 respectively. Each of these lower edges joins the bottom of the hopper over an angle of 90° around the respective axes 5 and 6. The top edges of the broad sides 41 of each of the funnel-shaped portions 25 and 26 constitute together the whole periphery of the funnel-shaped portions. The top edge of each narrow side 40 meets a corner of the square top side of the funnel-shaped portion at a point. The top of the hopper 2 is provided over its whole periphery with an inwardly bent over, horizontal rim 38 having a plurality of holes 39. The capacity of the illustrated hopper is about 500 liters.

Figure 2:
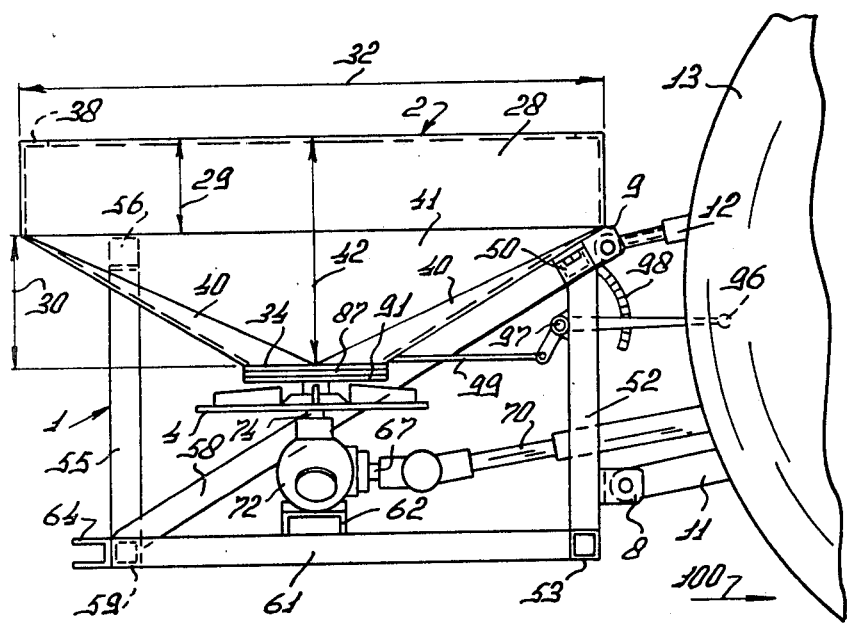
FIG. 2 is a side elevation of the spreader of FIG. 1, taken in the direction of the arrow II in FIG. 1.
Figure 3:
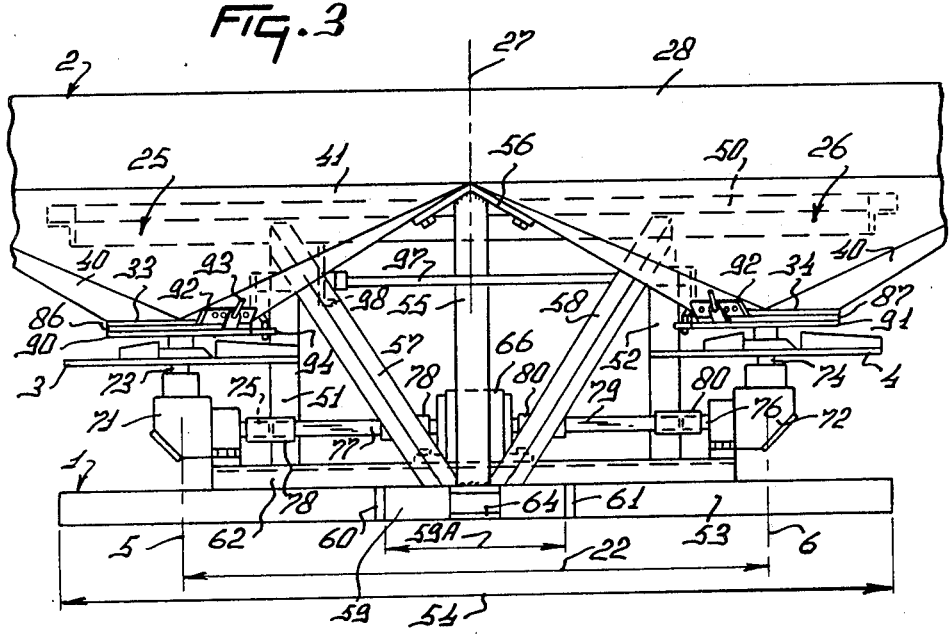
FIG. 3 is a rear view of most of the spreader of FIG. 1 taken in the direction of the arrow III in FIG. 1.

As will be appreciated from FIGS. 1 and 2, the front side of the hopper 2 bears on a horizontal top beam 50 of a vertical framework forming part of the frame 1. This framework comprises the beam 50, two vertical beams 51 and 52 connected to the beam 50 at their top ends and a horizontal beam 53 connected between the lower ends of the vertical beams 51 and 52. The beams 50 and 53 have approximately equal length and cover a distance 54, which exceeds the distance 22 between the rotary axes 5 and 6 of the distribution members. The beams 50 and 53 with the beams 51 and 52 are symmetrically disposed about the plane 27. The length 54 is approximately equal to two thirds of the width 31 of the hopper. The parallel vertical beams 51 and 52 are spaced apart by a distance equal to the distance 23 between the coupling members 7 and 8, which are secured near the lower ends of the vertical beams 51 and 52. The coupling member 9 is secured to the top beam 50 midway between the beams 51 and 52. The rear side of the hopper 2 bears on a vertical beam 55, the center line of which coincides with the vertical plane 27. The top side of the beam 55 is provided with strips 56, which are inclined to each other so that they meet the slanting top sides of the adjacent sides of the funnel shaped portions 25 and 26, to which they are secured. The beam 55 is approximately equal in length to the beams 51 and 51 and its lower end is secured to a horizontal beam 59, which is parallel to and at the same vertical level as the beam 53. Near the junction between the beams 55 and 56 are secured two supporting beams 57 and 58 which are inclined upwardly away from the connection near the lower end of the beam 55 and extend in diverging fashion; they are connected with the top ends of the respective beams 51 and 52. The beams 50 to 58 all have a rectangular cross-section and have the same sectional dimensions. These beams may, however, also have other shapes; they may, for example, be circular tubes.

The beam 59 has a length 59A, which is approximately equal to half the distance 23 between the beams 51 and 52. The beam 59 is secured at the center to the lower end of the beam 55. The beam 59 is provided with a drawhook 64 having, in cross-section, the shape of a U, the limbs of which extend rearwardly. The drawhook 64 is mounted so that one limb overlies the other. The ends of the beam 59 are connected to the beam 53 by means of tie beams in the form of strips 60 and 61. The strips 60 and 61 are parallel to one another. The width of each of the strips 60 and 61 is equal to the height of the beams 59, 53, the width of the strips extending vertically. The strips 60 and 61 are provided with a supporting beam 62, which extends parallel to the beams 53 and 59 and the center line of which coincides with a vertical plane 63 extending transversely of the vertical plane 27 and going through the rotary axes 5 and 6. The supporting beam 62 has a channel-shaped cross-section, the limbs extending downwardly from the web.

The center of the beam 62 is provided with a casing 66 accommodating transmission components and having shafts 67, 68 and 69. The end of each of these shafts protruding from the casing has key ways. The end of the shaft 67 is connected releasably to a coupling shaft 70, by which the shaft 67 is linked to the power take-off shaft of the tractor 13. The ends of the beam 62 are provided with driving casings 71 and 72, in which are journalled vertical shafts 73 and 74, to which the distribution members 3 and 4 respectively are secured. The transmission components in the casings 71 and 72 comprise shafts 75 and 76 equal to the shafts 68 and 69 and also having key ways. The shafts 68 and 75 are coupled with one another by an intermediate shaft 77, which is connected with the shafts 68 and 75 by means of internally keyed sleeves 78. In the same manner an intermediate shaft 79 is connected by internally keyed sleeves 80 with the ends of the shafts 69 and 76.

The top ends of the shafts 73 and 74 extend into the lower part of the funnel-shaped portions 25 and 26 and are provided with curved agitator blades 81 and 82 respectively. Viewed on plan, these blades narrow towards their ends and are curved from the axis in a direction opposite to the direction of rotation 83 of the distribution members 3 and 4.

Beneath the discs 33 and 34 there are arranged setting discs 86 and 87 each having a triangular outlet port 88 and 89 respectively. Beneath each of the discs 86 and 87 is arranged a dosing plate 90 and 91 respectively, each having one or more triangular openings corresponding with the ports 88 and 89 respectively. The disc 86 and the dosing plate 90 are rotatable in common and the plate 90 is also separately rotatable with respect to the disc 86 about the shaft 73. In the same manner the disc 87 and the dosing plate 91 are rotatable in common and the dosing plate 91 is also rotatable separately with respect to the disc 87 about the shaft 74. The discs 33 and 34, the discs 86 and 87 and the dosing plates 90 and 91 are perpendicular to the rotary axes 5 and 6 respectively. For fixing the disc 86 in position about the axis 5 the disc 33 is provided with a plate 92 having a plurality of openings for receiving a pin 93, which is connected with the disc 86. The disc 90 is provided with an extension 94 having a plurality of holes for receiving the end of the rod 95, which is coupled with a shaft 97 journalled in the frame and having a control member constituted by a setting arm 96 secured to it. The arm 96 is movable along a dial 98. By means of parts designated by the same reference numerals the disc 87 and the dosing plate 91 are rotatable and fixable in position about the axis 6, while the dosing plate 91 is connected by means of a coupling arm 99 with the shaft 97.

When putting the spreader into operation, it is attached by means of the coupling flanges 7, 8 and 9 to the arms of the lifting device of a tractor 13. The shaft 67 is connected by means of the coupling shaft 70 with the power take-off shaft of the tractor 13. The material to be spread is loaded into the hopper 2, after which the spreader can be run across the surface to be covered with the material. The spreader is particularly suitable for spreading fertilizers or seeds on fields. Before starting the distribution the openings in the dosing plates 90 and 91 are made to overlap to a greater or lesser extent the openings 88 and 89 in the discs 86 and 87. The adjustment of the dosing plates 90 and 91 can be performed by means of the setting arm 96, which adjustment can be read from the dial 98 to what extent the openings in the dosing plates 90 and 91 overlap the outlet ports in the discs 86 and 87. The material delivered through the openings falls onto the distribution members 3 and 4, which are rotated in the direction of the arrows 83 by the power take-off shaft of the tractor. The coupling shaft 70 drives the shaft 67, which actuates via the transmission in the casing 66 and the intermediate shafts 77 and 79, the driving gears in the casings 71 and 72 and the shafts 73 and 74.

Owing to the distance 21 between the distribution members, the distribution members can give a satisfactory spread of material so that during a run of the spreader each of the distribution members can spread a separate strip, these two strips satisfactorily joining one another so that a uniform distribution across a broad strip of soil is obtained. The direction of spreading of each distribution member can be adjusted to some extent by displacing the disc 86 and the plate 90 and the disc 87 and the plate 91 about the respective shafts 73 and 74. This displacement can be performed by inserting the pin 93 into a different opening in the strip 92 and by setting the arms 95 and 99 in other openings of the tags 94.

Owing to the distance 21 the distribution members occupy an advantageous position in the spreader. This permits of using a broad hopper ensuring a satisfactory feed of material to the distribution members. Owing to the distance 21 between the distribution members the depth of the broad hopper can be small so the hopper can be readily fixed, when it is resting on the ground or when it is held in a low position by the lifting device. Owing to the larger width 31 the hopper can be readily filled from a large tank or wagon. Moreover, owing to the low hopper structure the driver of the tractor 13 has a satisfactory view over the hopper. Since the rotary axes 5 and 6 of the distribution members are spaced apart by a distance exceeding the distance between the coupling flanges 7 and 8, the frame can be designed so that it is located at least for the major part between the distribution members, viewed on plan. The resultant frame structure forms a satisfactory support for the hopper, while the frame parts will not hinder the distribution of the material, since the frame parts are located entirely outside the paths of two distribution members. The design shown provides a strong and simple frame, which can be built up in a simple manner at low cost. The shape of the frame permits easy cleaning, while owing to the shape of the frame and of the hopper and the location of the distribution members and of the various parts, all components are readily accessible.

Maintenance of the device is, therefore, a simple job that takes little time, which is conducive to the longevity of the spreader. The drawhook 64 can be used for coupling a wagon or a further device with the spreading device so that they can be drawn together.

The capacity of the hopper may be enlarged by arranging an extension piece on the top of the hopper. FIGS. 5, 6 and 7 show such an extension piece 101. Owing to the larger upper circumference of the hopper, the extension piece may be quite low, and yet the capacity of the hopper may be appreciably increased. In the embodiment shown in FIGS. 5, 6 and 7 the extension has a height 102, which is approximately one and one-half times the height 29 of the hopper portion 28. Around its top and bottom edges the extension piece 102 has inwardly bent-over rims 103 and 104, which correspond with the rim 38 on the top edge of the hopper 2. At least the lower rim 103 has a plurality of openings corresponding with the openings 39 in the rim 38. The extension piece 101 can be secured by means of bolts 105 to the top of the hopper 2, these bolts being inserted into the openings 39 and the corresponding openings in the rim 103. With the height 102 of the extension piece the capacity thereof is about 500 liters corresponding approximately to the total capacity of the hopper 2. In this way the spreader can carry a total of about 1000 liters of material. This is particularly advantageous for spreading large quantities of material per unit of surface or for covering large surfaces. Consequently filling of the hopper needs be repeated less frequently, which is particularly advantageous in the case of a remote filling station.

Although various features of the spreader, described and illustrated in the drawings, will be set forth in the following claims as inventive features, it is to be noted that the invention is not necessarily limited to these features and encompasses all of the features that have been described both individually and in various combinations.

Having thus described my invention, what I claim as new and desire to secure by Letters Patent of the United States is:

1. A spreader comprising a hopper for receiving material to be spread and two distribution members mounted beneath said hopper for rotation about upwardly extending rotary axes, said distribution members, at their points of nearest approach, being spaced apart by a distance which is greater than one-half the diameter of the circle traced in operation by the radially outermost point of one of said distribution members, said hopper being supported by a frame including frame members in front of said hopper and at least two frame beams connected to said frame members extending from the front to the rear of said hopper between said distribution members whereby said frame does not hinder material spread by said distribution members.

2. A spreader as claimed in claim 1, wherein the distance between said rotary axes is greater than twice the diameter of the said circle.

3. A spreader as claimed in claim 1, wherein said rotary axes of said two distribution members are spaced apart by a distance substantially equal to two and one-half times the diameter of the said circle.

4. A spreader as claimed in claim 3, wherein each said distribution member includes a circular disc which has a diameter of about forty centimeters.

5. A spreader as claimed in claim 4, wherein the shortest line of connection between the inboard edges of said distribution members is perpendicular to a vertical plane containing the longitudinal center line of the spreader which extends in the intended direction of operative travel.

6. A spreader as claimed in claim 5, wherein said frame members includes means for connecting said frame to the lower arms of a three point lifting device of a tractor, and wherein said rotary axes of said distribution members are spaced apart by distance exceeding the distance between said coupling members on said frame.

7. A spreader comprising a frame, a hopper and two distribution members mounted beneath said hopper for rotation about upwardly extending rotary axes, said frame supporting said hopper and said distribution members and being provided with coupling members for connecting the spreader to lower arms of a lifting device of a tractor, the centers of said distribution members being spaced apart by a distance greater than the distance between said coupling members for connection to the lower arms of the lifting device, said frame including vertical frame members proximate said coupling members, frame beams extending from the upper aspects of said frame members and converging to the rear of the spreader between said distribution members, a further vertical frame member between said frame beams and said hopper at the rear of the spreader.

8. A spreader as claimed in claim 7 wherein the distance between said centers of said distribution members is about one and one-half times the distance between the coupling members for attaching the frame to the lower arms of the lifting device.

9. A spreader as claimed in claim 8, wherein the centers of said distribution members are spaced apart by about one hundred centimeters.

10. A spreader as claimed in claim 9, wherein said hopper has a width, measured in a direction perpendicular to the intended direction of operative travel of the spreader, which is substantially twice the greatest depth of said hopper.

11. A spreader comprising a frame, a hopper and two distribution members mounted beneath said hopper for rotation about upwardly extending rotary axes, said hopper having a width, measured perpendicular to the intended direction of operative travel of the spreader, which is at least substantially twice the greatest depth of said hopper, said hopper having a wall which comprises a pair of side-by-side funnel-shaped portions, each respective said portion having an opening above each of said distribution members, each funnel-shaped portion having, in cross-section, an octagonal shape, the wall part of each said funnel-shaped portion of said hopper comprising four sides which converge from bottom to top and four further sides which diverge from bottom to top.

12. A spreader as claimed in claim 11, wherein the width of said hopper is greater than three times the greatest depth of said hopper.

13. A spreader as claimed in claim 11, wherein the width of said hopper is greater than five times the greatest depth of said hopper.

14. A spreader as claimed in claim 13, wherein the width of said hopper is about two meters.

15. A spreader as claimed in claim 14, wherein the width of said hopper is substantially twice the length of said hopper, measured in a direction parallel to the intended direction of operative travel of the spreader.

16. A spreader as claimed in claim 11, wherein each said opening comprises an outlet port provided with a dosing mechanism for regulating the size of the flow passage of the corresponding said outlet port.

17. A spreader as claimed in claim 16, wherein a common control member is provided for coupling said two dosing mechanisms together.

18. A spreader as claimed in claim 16, wherein the position of each said outlet port is adjustable by a respective two setting mechanisms provided about the rotary axis of the respective said distribution member.

19. A spreader as claimed in claim 18 wherein one of said setting mechanisms for each said outlet port is arranged near the bottom of said hopper.

20. A spreader as claimed in claim 11, wherein the top portion of said hopper has a further wall which defines a parallelepiped space, said further wall joins the top of said wall parts of said funnel-shaped portions of said hopper.

21. A spreader as claimed in claim 20, wherein said parallelepiped-shaped space has a height which is at least substantially equal to one-third of the greatest total height of said hopper.

22. A spreader as claimed in claim 21, wherein the hopper has a capacity of about one-half a cubic meter.

23. A spreader as claimed in claim 21, wherein the top side of said hopper is provided with a rim which joins with said wall, said rim and an extension piece adapted to be secured together whereby the capacity of said hopper including said extension piece is substantially increased.

24. A spreader as claimed in claim 11, wherein the top side of said hopper is provided with a first substantially horizontal inwardly bent-over rim.

25. A spreader comprising a frame, a hopper and two distribution members mounted beneath said hopper for rotation about upwardly extending rotary axes, said hopper having a width, measured perpendicular to the intended direction of operative travel of the spreader, which is at least substantially twice the greatest depth of said hopper, said frame including a centrally located vertical beam at its rear side and a pair of vertical beams at its forward side which are spaced an equal distance from a vertical plane through the longitudinal center line of the spreader and a pair of horizontal beams on the forward side of the spreader which are rigidly connected to said vertical beams.

26. A spreader as claimed in claim 25, wherein an extension piece is provided, the bottom of said extension piece having a second substantially horizontal inwardly bent-over rim, which matches a first substantially horizontal inwardly bent-over rim of said hopper, securing means provided on said rims whereby they can be secured together.

27. A spreader as claimed in claim 26, wherein the height of said extension piece is less than the greatest depth of said hopper.

28. A spreader as claimed in claim 27, wherein said extension piece has a capacity of about one-half of a cubic meter.

29. A spreader comprising a frame, a hopper and two distribution members mounted beneath said hopper for rotation about upwardly extending rotary axes, said hopper having a width, measured perpendicular to the intended direction of operative travel of the spreader, which is at least substantially twice the greatest depth of said hopper, at least part of said frame being located between said distribution members when viewed in plan, said frame comprising an upwardly extending framework of beams, said framework being connected with said hopper and being located near the front of the spreader when viewed in plan, said framework comprising two substantially vertical frame beams, the respective bottom and top ends of which are interconnected by substantially horizontal frame beams, said horizontal frame beams extending over a longer distance than the distance between said vertical frame beams.

30. A spreader as claimed in claim 29, wherein coupling members are provided near the bottom ends of said vertical frame beams for attaching the spreader to the lower lifting arms of a lifting device of a tractor.

31. A spreader as claimed in claim 30, wherein the top horizontal frame beam of said framework is provided with a coupling member by which the spreader can be connected with the top lifting arm of the lifting device of a tractor.

32. A spreader as claimed in claim 31, wherein said part of said frame comprises further frame beams which are provided which are inclined from the top ends of said vertical beams of said framework downwardly to the rear, an extending supporting beam connected to said further frame beams, the top end of said upwardly extending beam is connected to the hopper.

33. A spreader as claimed in claim 32, wherein the lower end of said supporting beam is connected with a horizontal rear frame beam which extends substantially transversely of the longitudinal center line of the spreader.

34. A spreader as claimed in claim 33, wherein said horizontal rear frame beam is connected by tie beams with said lower horizontal beam of said framework of said frame.

35. A spreader as claimed in claim 34, wherein said beams consist of strips, the broad sides of said strips extending vertically.

36. A spreader as claimed in claim 35, wherein said tie beams have secured to them a further supporting beam which extends substantially transversely of the intended direction of operative travel of the spreader and which provides a support for drive means which are provided for said distribution members.

37. A spreader comprising a frame including frame beams and a framework, a hopper and two distribution members mounted beneath said hopper for rotation about substantially vertical rotary axes, said hopper having a width, measured perpendicular to the intended direction of operative travel of the spreader, which is at least substantially twice the greatest depth of said hopper, a driving shaft rotatably mounted on said frame, said framework disposed forward relative to said hopper and having two spaced-apart vertical beams and a top beam and lower beam rigidly connected thereto, said vertical beams and said top beam provided with coupling members for connection to the three-point lifting device of a tractor, said framework further including a pair of support beams connected at the upper aspects of said vertical beams and converging therefrom to the rear and downwardly to where they connect to a horizontal beam member in said framework, a pair of spaced-apart tie-beams connecting said horizontal beam member and said lower beam, said driving shaft adapted to be coupled with a power take-off shaft of a tractor, a transmission in a transmission casing centrally mounted on said frame, said transmission having drive shafts coupled with said distribution members, said drive shafts being located above a horizontal frame beam of said frame which is supported by said tie-beams and extends transversely to the intended direction of travel of the spreader in said frame, each said driving shaft being coupled with said transmission whereby said distribution members are adapted to be driven by a power take-off shaft from a tractor, said driving shafts being located between said transmission in said transmission casing and further transmissions in further transmission casings located under each said distribution member, said horizontal frame beam supporting said first mentioned transmission at its center and said further transmissions at its respective ends.

38. A spreader as claimed in claim 37, wherein said driving shaft and said transmission casing are located substantially at the center of the spreader, as viewed on plan, and on either side of said transmission casing, said drive shafts extending in opposite directions with their respective outward ends being coupled with said distribution members.

39. A spreader as claimed in claim 38, wherein said drive shafts are coupled by connecting means comprising sleeves having internal keyways with upwardly extending shafts connected to said distribution members.

40. A spreader as claimed in claim 39, wherein said connection means comprises driving casings which accommodate said upwardly extending shafts connected to said distribution members, a driving casings being fastened to said horizontal beam of said frame near the ends thereof.

41. A spreader as claimed in claim 37, wherein rotary shafts are provided for said distribution members which extend upwards into the lower region of said hopper and rotate in opposite directions and each said rotary shaft is provided inside said hopper with an agitator.

42. A spreader as claimed in claim 41, wherein said agitator comprises a curved blade which is curved rearwardly away from its respective said shaft with respect to the direction of operative rotation of such shaft, said blade provided on the left said shaft rotating counterclockwise and said blade provided on the right said shaft rotating clockwise.

43. A spreader as claimed in claim 37, wherein said two distribution members are the same size.

44. A spreader comprising a frame, a hopper and two distribution members mounted beneath said hopper for rotation about upwardly extending rotary axes, said hopper having a width, measured perpendicular to the intended direction of operative travel of the spreader, which is at least substantially twice the greatest depth of said hopper, at least part of said frame, viewed in plan, being located between said distribution members, said frame comprising an upwardly extending framework of beams which is connected with said hopper and is located near the front of the spreader, when viewed in plan, said framework comprising two substantially vertical frame beams, the respective bottom and top ends of which are interconnected by substantially horizontal frame beams, said horizontal frame beam extending over a longer distance than the distance between said vertical frame beams, coupling members being provided near the bottom ends of said vertical frame beams for attaching the spreader to the lower lifting arms of a lifting device of a tractor, said top horizontal frame beam of said framework being provided with a coupling member by which the spreader can be connected with the top lifting arm of the lifting device of a tractor, said part of said frame comprising further frame beams which are inclined from the top ends of said vertical beams of said framework downwardly to the rear, an upwardly extending supporting beam connected to said further frame beams, the top end of said upwardly extending beam being connected to said hopper, the lower end of said supporting beam being connected with a horizontal rear frame beam which is provided to extend substantially transversely relative to the longitudinal center line of the spreader, the rear side of said frame beam provided with a drawhook mounted centrally on said horizontal rear frame beam for the attachment of a further vehicle or device.

45. A spreader as claimed in claim 44, wherein said drawhook is arranged proximate the bottom side of the hindmost, vertical frame beam of said frame.

46. A spreader as claimed in claim 44, wherein said drawhook is channel-shaped, with one limb overlying the other and the web thereof being fastened to said horizontal rear frame beam.

* * * * *